United States Patent
D'Helon et al.

(10) Patent No.: US 11,037,459 B2
(45) Date of Patent: Jun. 15, 2021

(54) FEEDBACK SYSTEM AND METHOD FOR IMPROVING PERFORMANCE OF DIALOGUE-BASED TUTORS

(71) Applicant: International Business Machines Corporation, Armonk, NY (US)

(72) Inventors: Cassius D'Helon, Coral Gables, FL (US); Jae-Wook Ahn, Nanuet, NY (US); Nirmal K. Mukhi, Ramsey, NJ (US); Vinay Kumar Reddy Kasireddy, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 499 days.

(21) Appl. No.: 15/989,130

(22) Filed: May 24, 2018

(65) Prior Publication Data

US 2019/0362643 A1 Nov. 28, 2019

(51) Int. Cl.
| | | |
|---|---|---|
| *G09B 7/04* | (2006.01) | |
| *G09B 7/10* | (2006.01) | |
| *G09B 7/07* | (2006.01) | |
| *G06F 3/16* | (2006.01) | |
| *G06F 3/0484* | (2013.01) | |
| *G06F 40/40* | (2020.01) | |

(52) U.S. Cl.
CPC .............. *G09B 7/04* (2013.01); *G09B 7/07* (2013.01); *G09B 7/10* (2013.01); *G06F 3/04842* (2013.01); *G06F 3/167* (2013.01); *G06F 40/40* (2020.01)

(58) Field of Classification Search
CPC ... G09B 7/04; G09B 7/00; G09B 5/00; G09B 5/04; G09B 17/006; G09B 19/00; G09B 19/06; G09B 5/065; G09B 5/12; G09B 5/14; G10L 15/22; G10L 15/18; G06F 16/24522; G06F 16/3344; G06F 40/20; G06F 16/243

See application file for complete search history.

(56) References Cited

U.S. PATENT DOCUMENTS

| 4,764,120 A | 8/1988 | Griffin et al. |
| 5,002,491 A * | 3/1991 | Abrahamson ............ G09B 5/14 434/322 |

(Continued)

OTHER PUBLICATIONS

Valerie J. Shute, Focus on Formative Feedback, Mar. 2007, ETS, pp. 1-55 (Year: 2007).*

(Continued)

*Primary Examiner* — Justin S Lee
(74) *Attorney, Agent, or Firm* — Garg Law Firm, PLLC; Rakesh Garg; Joseph Petrokaitis

(57) ABSTRACT

Improving performance of a dialogue-based tutor includes receiving feedback from a user associated with a natural language interaction of the user with a dialogue-based tutoring (DBT) system. The DBT system includes training data and domain-specific content. One or more feedback categories is presented to the user based upon the feedback. A selection of a feedback category from among the one or more feedback categories is received from the user. A feedback candidate is generated based upon the feedback and the selected feedback category. The feedback candidate is indicative of a potential change in one or more of the training data and the domain-specific content based upon the feedback.

18 Claims, 8 Drawing Sheets

(56) References Cited

U.S. PATENT DOCUMENTS

| | | | |
|---|---|---|---|
| 5,537,618 A * | 7/1996 | Boulton | G09B 5/065 |
| | | | 434/118 |
| 6,347,943 B1 | 2/2002 | Fields et al. | |
| 6,461,166 B1 * | 10/2002 | Berman | G09B 7/04 |
| | | | 434/322 |
| 6,628,918 B2 * | 9/2003 | Roschelle | G09B 7/00 |
| | | | 434/322 |
| 6,634,887 B1 * | 10/2003 | Heffernan, III | G09B 7/02 |
| | | | 434/322 |
| 6,692,256 B2 | 2/2004 | Chan et al. | |
| 8,095,363 B1 | 1/2012 | Gorin et al. | |
| 8,155,959 B2 | 4/2012 | Weng et al. | |
| 9,984,386 B1 * | 5/2018 | Bhatia | G06Q 30/0241 |
| 2001/0047261 A1 | 11/2001 | Kassan | |
| 2002/0192631 A1 | 12/2002 | Weir et al. | |
| 2004/0018479 A1 * | 1/2004 | Pritchard | G09B 7/02 |
| | | | 434/350 |
| 2006/0069561 A1 * | 3/2006 | Beattie | G10L 15/22 |
| | | | 704/251 |
| 2006/0069562 A1 * | 3/2006 | Adams | G09B 19/06 |
| | | | 704/251 |
| 2008/0177545 A1 * | 7/2008 | Li | G06F 40/211 |
| | | | 704/255 |
| 2009/0307159 A1 * | 12/2009 | Pinckney | G06Q 30/0601 |
| | | | 706/11 |
| 2010/0062411 A1 * | 3/2010 | Bartholomew | G09B 7/00 |
| | | | 434/350 |
| 2011/0066998 A1 * | 3/2011 | Scandura | G06N 5/022 |
| | | | 717/100 |
| 2012/0052476 A1 * | 3/2012 | Graesser | G09B 7/04 |
| | | | 434/362 |
| 2013/0130219 A1 * | 5/2013 | Elzinga | G09B 5/00 |
| | | | 434/362 |
| 2013/0254153 A1 | 9/2013 | Marcheret | |
| 2014/0222816 A1 * | 8/2014 | Chen | G06F 16/3337 |
| | | | 707/737 |
| 2015/0149176 A1 | 5/2015 | Giulianelli et al. | |
| 2016/0071022 A1 * | 3/2016 | Bruno | G06F 16/3349 |
| | | | 706/12 |
| 2018/0032890 A1 * | 2/2018 | Podgorny | G06Q 30/016 |
| 2019/0251417 A1 * | 8/2019 | Bennett | G06N 20/00 |
| 2020/0327818 A1 * | 10/2020 | Byron | G09B 19/00 |

OTHER PUBLICATIONS

Clancey et al., Applications-oriented AI research: Education. No. STAN-CS-79-749. Stanford Univ CA Dept of Computer Science, 1979. (Related).

* cited by examiner

FEEDBACK SYSTEM AND METHOD FOR IMPROVING PERFORMANCE OF DIALOGUE-BASED TUTORS

TECHNICAL FIELD

The present invention relates generally to a method, system, and computer program product for improving performance of dialogue-based tutors. More particularly, the present invention relates to a method, system, and computer program product for a feedback system and method for improving performance of dialogue-based tutors.

BACKGROUND

Dialogue-based tutoring systems (DBTs) use natural language to engage students in a Socratic conversation about a topic of interest. In general, the tutor's intent is to facilitate learning by guiding students through relevant concepts using questions, hints, prompts, etc., as well as giving feedback. Students engaging with DBTs also benefit from improvements in their memory and comprehension of the source text since they are required to provide natural language responses. The learning principles and strategies employed by DBTs include encouraging constructive behaviors and self-explanations, deep reasoning questions, and conceptual understanding through scaffolding in which teachers model or demonstrate how to solve a problem and then step back, offering support if needed. Particular DBTs are based on an expectation-misconception discourse model, and have demonstrated significant learning gains over non-interactive learning materials in various math and science domains.

The scalability of current DBTs is limited in general, since the effort required to adapt tutors for a new domain or textbook is non-trivial, even if the use case and learning goals are clearly defined. In particular, it is difficult to scale up the understanding of student responses across different knowledge domains.

SUMMARY

The illustrative embodiments provide a method, system, and computer program product. An embodiment of a method for improving performance of a dialogue-based tutor includes receiving feedback from a user associated with a natural language interaction of the user with a dialogue-based tutoring (DBT) system. In the embodiment, the DBT system includes training data and domain-specific content. The embodiment further includes presenting one or more feedback categories to the user based upon the feedback. The embodiment further includes receiving, from the user, a selection of a feedback category from among the one or more feedback categories. The embodiment still further includes generating a feedback candidate based upon the feedback and the selected feedback category. In the embodiment, the feedback candidate is indicative of a potential change in one or more of the training data and the domain-specific content based upon the feedback.

Another embodiment further includes receiving metadata including contextual information associated with the feedback with respect to the selected category. In another embodiment, generating the feedback candidate is further based upon the metadata.

Another embodiment further includes storing the feedback, selected feedback category, and feedback candidate in a database. Another embodiment further includes presenting the feedback candidate to at least one reviewer, and receiving an approval decision for the feedback candidate from the at least one reviewer.

Another embodiment further includes updating a database with the approval decision. Another embodiment further includes determining that a measure of approval decisions for the feedback candidate is greater than or equal to a threshold value. Another embodiment still further includes retraining, responsive to the measure of approval decisions being greater than or equal to the threshold value, the training data of the DBT system based upon the feedback candidate. In another embodiment, retraining the training data includes retraining one or more classifiers of the DBT system based upon the feedback candidate.

Another embodiment further includes determining that negative feedback related to the change has increased above a predetermined level, and rolling back the retraining of the training data of the DBT system.

Another embodiment further includes re-writing, responsive to the measure of approval decisions being greater than or equal to the threshold value, the domain-specific content of the DBT system based upon the feedback candidate. Another embodiment further includes notifying an editor of a necessity for rewriting the domain-specific content, and receiving edited domain-specific content from the editor.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
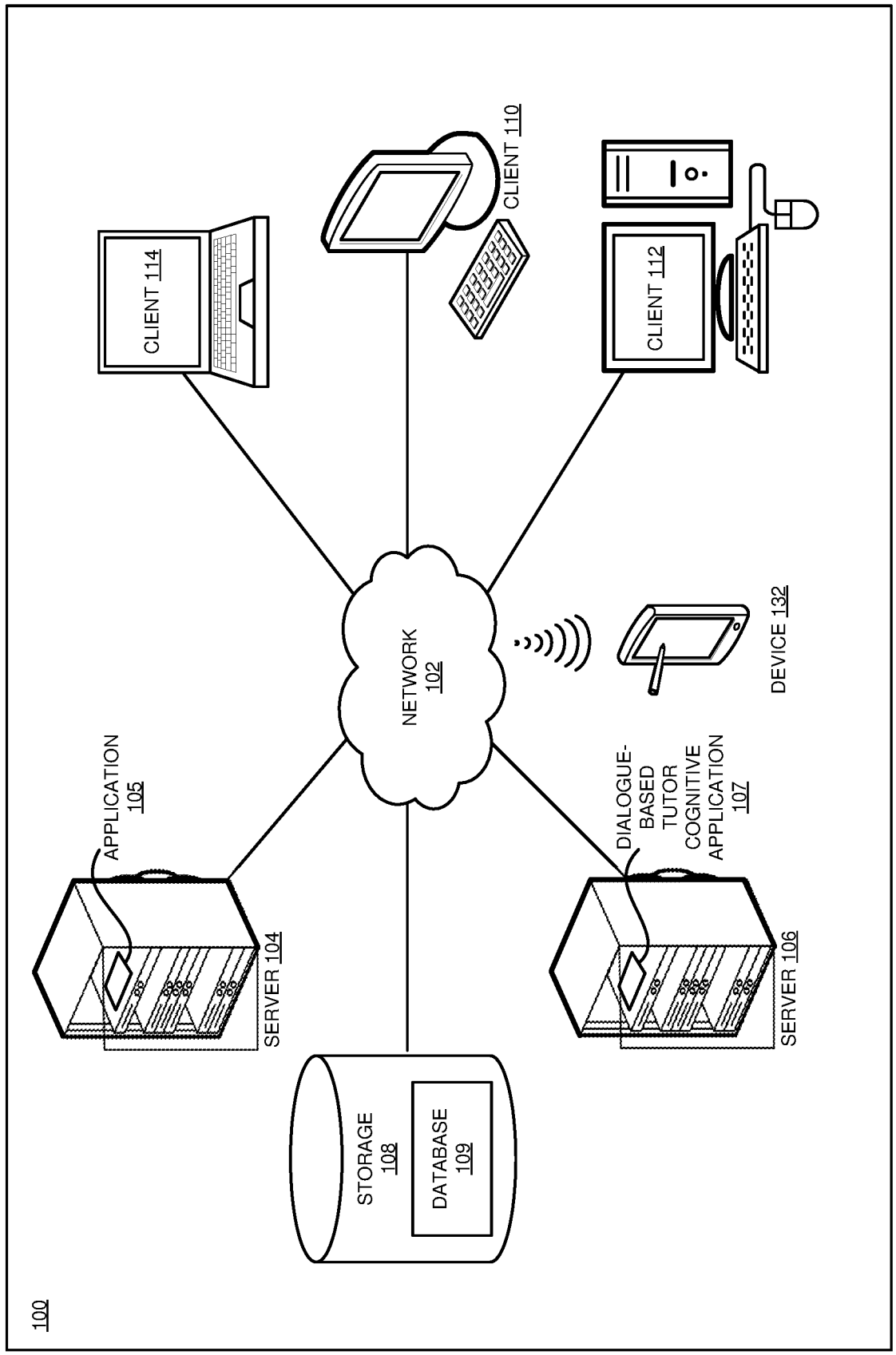
FIG. 1 depicts a block diagram of a network of data processing systems in which illustrative embodiments may be implemented.

One or more embodiments relate to the field of educational tutoring systems, specifically, but not limited to, a large-scale feedback system to improve the training and content of dialogue-based tutors. Dialogue-based tutors (DBTs) are a sub-class of intelligent tutorial systems, which are defined by including the use of natural language conversation to communicate with students in the tutoring process. Dialogue-based tutors use interactive tutorial systems and methods to communicate with students.

Dialogue-based tutors are inherently susceptible to a number of problems affecting dialogue quality, including misclassifications in the processing of natural language student responses, and poor quality of content in the domain model. The likelihood of conversational dissonance is amplified when this type of event occurs, as the student will interpret the tutor's utterance in an unintended way, and the student's follow-up response will in turn confuse the state of the tutor.

Conventional dialog-based tutoring systems are not traditionally scalable because training of classification systems requires large amounts of labeled data for each domain, the requirement of labor-intensive monitoring of actual use to retrain and continuously improve the system, and using student interactions to identify problems with the content that drives a conversation is generally a painstaking manual effort. In addition, DBTs are often not robust because they cannot deal with unanticipated slang or colloquialisms. Traditionally, the supervised training of natural language classifiers and the updating of domain-specific content is performed manually in discrete batches.

The illustrative embodiments recognize that the presently available tools or solutions do not address these needs or provide adequate solutions for these needs. The illustrative embodiments used to describe the invention generally address and solve the above-described problems and other problems related to improving performance of dialogue-based tutors.

Various embodiments described herein provide a feedback system to improve the natural language understanding and the quality of the content for dialogue-based tutors (DBTs), also referred to herein as "tutors", in various knowledge domains. In one or more embodiments, feedback is collected from a large number of student annotations in the dialogue of the DBT, or from instructors or subject-matter experts (SME's). In a particular embodiment, student annotations are stored in a transcript database, along with the entire conversation. In an embodiment, each annotation is then sent to a number of active reviewers who can see the annotation category, the student response and other context about the dialogue turn. In particular embodiments, proposed changes are reviewed by other students or instructors using the same tutor. If the changes are approved by a threshold number of reviewers, an application programming interface (API) is triggered to automatically retrain the natural language classifiers, or updating domain-specific dialogue content.

The feedback system provided in various embodiments reduces the negative effects of conversational dissonance by giving students the opportunity to improve the training and content of dialogue-based tutors, as soon as the students detect poor dialogue quality. One or more embodiments enable proposed changes to be implemented automatically, on a continuous basis, as soon as the changes are approved by an independent review process.

One or more embodiments provide for using continuous student feedback and validation to improve DBTs in three stages: a feedback stage, a review stage, and a retraining/rewriting stage. According to an embodiment, during the feedback stage an application receives categorized feedback from users while the users are interacting with the DBT. In particular embodiments, users may be students who are learning a topic by having a conversation with the tutor, or instructors or SME's contributing to the learning course.

In the case of student use, a feedback interface collects student annotations that are embedded in the context of each dialogue turn. In one or more embodiments, students can provide annotations at any turn in the conversation. In particular embodiments, students indicate that they want to provide feedback by clicking on a contextual icon in the feedback interface, and the tutor displays a selection of feedback categories which indicate possible intents of the students. The types of feedback shown for each dialogue turn are chosen to be relevant to the interaction in that turn. In addition, students may leave general comments or positive feedback. New feedback categories can also be introduced in the feedback system to reflect students' concerns that were not addressed previously.

In one or more embodiments, annotations are collected from students during their chat with the tutor, and the annotations are used to drive the feedback process. In a feedback system according to an embodiment, an annotation is a predefined, structured comment that students can select quickly and intuitively whenever they have an issue with the tutor response. For example, if a student disagrees with the tutor assessment of the student's answer, the student may select "My answer is entirely correct" as the student's annotation.

In the case of instructor or SME use, the feedback interface collects their annotations in the transcript of a student conversation with the tutor.

In an embodiment, once a student selects a feedback category, the tutor collects metadata required to present feedback candidates to reviewers. If required, students may be asked by the tutor to provide additional information related to their annotation. In one or more embodiments, the metadata includes information that is directly relevant to each feedback category. Examples of metadata that may be including in one or more embodiments includes a student identifier, learning objective identifier, a conversation identifier, a turn identifier, a date, a timestamp, and a feedback category.

Examples of feedback categories include natural language understanding phrases such as "The tutor didn't understand my synonym", "My answer is partly correct", "My answer is entirely correct", "I asked a question", or "That was my answer". Other examples of feedback categories include domain-specific dialogue content such as "The fill-in word isn't a key concept" and "The last question is confusing". Other examples of feedback categories may be related to the graphical user interface such as "The tutor is not responding" or "I couldn't type in the text box."

In various embodiments, annotations are chosen for the DBT by analyzing their relative frequency in student feedback from pilot trials. In particular embodiments, only a subset of the annotations is visible in each dialogue turn, depending on the context. For example, students can choose "The fill-in word isn't a key concept" only after answering a fill-in-the-blank type question. In addition, students may leave general comments, and new categories can be introduced to reflect other issues.

An example conversation with a DBT for receiving categorized feedback is as follows:

DBT: "What happens to our hair as we get older?"

Student: "It turns white"

DBT: "I'm sorry, that doesn't match what I have. Hair becomes gray as we get older."

Student chooses to provide feedback for the last exchange which may be done in the same conversational interaction with the DBT, or alternatively at a different time.

Student selects the feedback category "My answer is correct"

DBT: "Thank you for letting me know that 'It turns white' should have been marked correct. I'll try to learn from this!"

At this point "It turns white" becomes a candidate in the category "Correct Answer" for the question "What happens to our hair as we get older?"

In the review stage, the student annotations are stored in a feedback database, and are presented to reviewers who collectively decide if the feedback candidates should be used to make changes in the tutor training or content. In one or more embodiments, reviewers are chosen that are knowledgeable in the domain of the student annotations. In particular embodiments, the reviewers may include students or instructors who are knowledgeable about a topic. For example, feedback candidates may be presented to students with a high mastery of the same topic. In other embodiments, other suitable criteria may be used for selecting reviewers to review feedback.

For each feedback candidate, reviewers are requested to consider the earlier student's claim in the appropriate context which is described by the metadata. Reviewers can choose to approve or disapprove the feedback candidate. The feedback decision is kept in the feedback database.

In particular embodiments, the feedback candidates may be shown to students during normal use of the tutor during their conversations. In particular embodiments, each candidate is presented sequentially, and students are asked to answer a yes/no question to approve or disapprove of the proposed changes.

As an example, active reviewers may see the feedback annotation: "My answer is entirely correct" plus (i) the tutor question (ii) the reference answer and (iii) the student answer. Reviewers can either agree or disagree with the annotation, and when the sum of their responses crosses an approval threshold, the decision is used to trigger a retraining event for the tutor. In one or more embodiments, approval thresholds can vary for different types of annotations, and may also depend on the level of expertise of each reviewer. For example, an annotation that's validated by an expert instructor will more likely lead to retraining of the tutor.

An example conversation with a DBT during a review stage is as follows:

DBT: "Great job on this learning objective, you got most of it correct. Do you have a couple of minutes to help me improve my understanding of this topic?"

Student: "yes"

DBT: "For the question 'What happens to our hair as we get older?' do you think that 'It turns white' is a correct answer?"

Student: "yes"

DBT: "Ok, thanks for confirming! I have one more . . . "

At this point, the system records the decision of the reviewer in the feedback database.

In an embodiment, once a number or percentage of or other measure of approvals for a feedback candidate reaches a threshold value, for example a majority of reviewers, the system changes the DBT based upon the feedback candidate. In particular embodiments, the system retrains one or more classifiers of the DBT automatically using the new labeled data for feedback categories that Involve natural language understanding. In particular embodiments, automated retraining is performed using a training API provided by the classifier.

For example, if a student claims that the student's answer is entirely correct and the reviewers agree, then an API for the response analyzer retrains the corresponding reference answer in the DBT. In various embodiments, the types of retraining events are specific to the natural language classifiers and the dialogue content of the DBT: (i) new synonyms are added to a domain synonym dictionary; (ii) a response analyzer is retrained using additional student answers; (iii) an intent classifier is retrained to handle misclassifications (e.g., to distinguish between student answers and student questions); (iv) domain keywords are updated; and (v) hint questions asked by the tutor are updated.

In particular embodiments, the training changes are implemented on an incremental basis, as each feedback candidate is approved, and are verified immediately by checking the appropriate response.

In one or more embodiments, following the change, the system observes the amount of feedback provided for that particular content item, with the expectation that negative feedback should be reduced. However, if the negative feedback is increased, this may trigger an automated rollback of the approved change. In particular embodiments, the DBT provides a provides a mechanism for system administrators to configure the feedback system thresholds for triggering retraining as well as rollback of an approved changed.

In particular embodiments, the cumulative effect of training changes on tutor performance is monitored in the longer term using a set of metrics for the domain-specific training and the dialogue quality. The metrics can be measured automatically by using test data, as well as manually by analyzing a sample of conversation transcripts. In particular embodiments, the monitoring is performed either at regular intervals, or after a set number of events for each type of retraining. If a significant negative impact is observed, then changes can be rolled back.

In an embodiment, once a number or percentage of approvals for a feedback candidate reaches a threshold value, in a rewriting content stage the system notifies an SME and updates a dashboard of approved changes for the SME to review for feedback categories that involve natural language understanding. In the embodiment, SMEs act as content editors by rewriting reference questions, reference answers, or any other type of domain-specific content.

In the embodiment, following the change, the system observes the amount of feedback provided for that particular content item, with the expectation that negative feedback should be reduced. If the negative feedback is increased, this may trigger an automated rollback of the approved change. In particular embodiments, the DBT provides a provides a mechanism for system administrators to configure the feedback system thresholds for triggering retraining as well as rollback of an approved changed.

One or more embodiments provide for structured feedback categories to collect feedback and turn review into yes/no decisions, improving classifier training continuously at large scale, improving domain-specific content at large scale using student feedback, and monitoring performance automatically through student feedback.

The illustrative embodiments are described with respect to certain types of dialog-based tutor processes, network devices, transmissions, validations, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
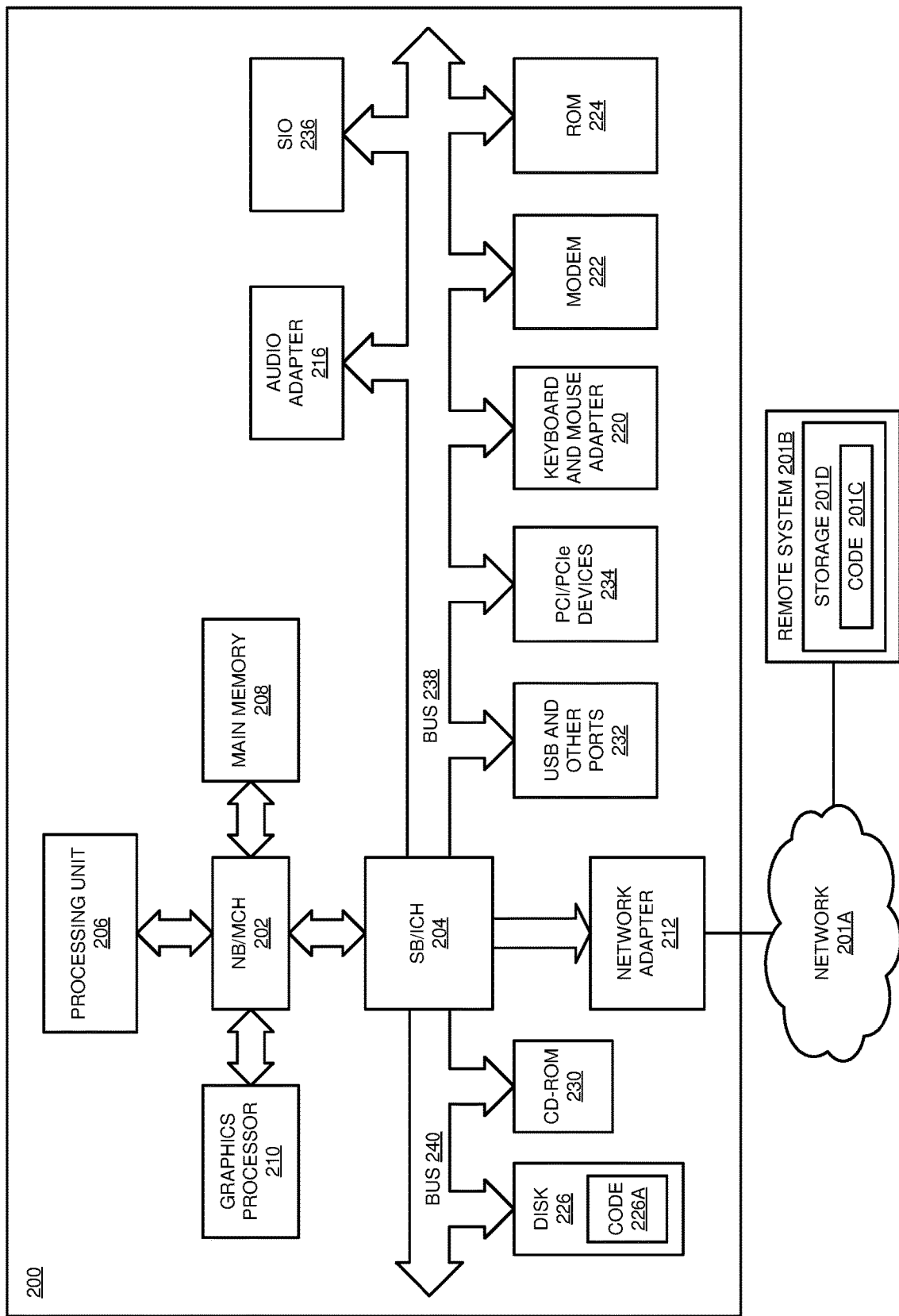
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store feedback in database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Application 105 of server 104 implements an embodiment of an algorithm for a feedback system and method for improving performance of dialogue-based tutors as described herein. Dialogue-based tutor cognitive application 107 implements one or more dialogue-based tutoring processes on textual data such as natural language processing (NLP) as described herein with respect to various embodiments.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
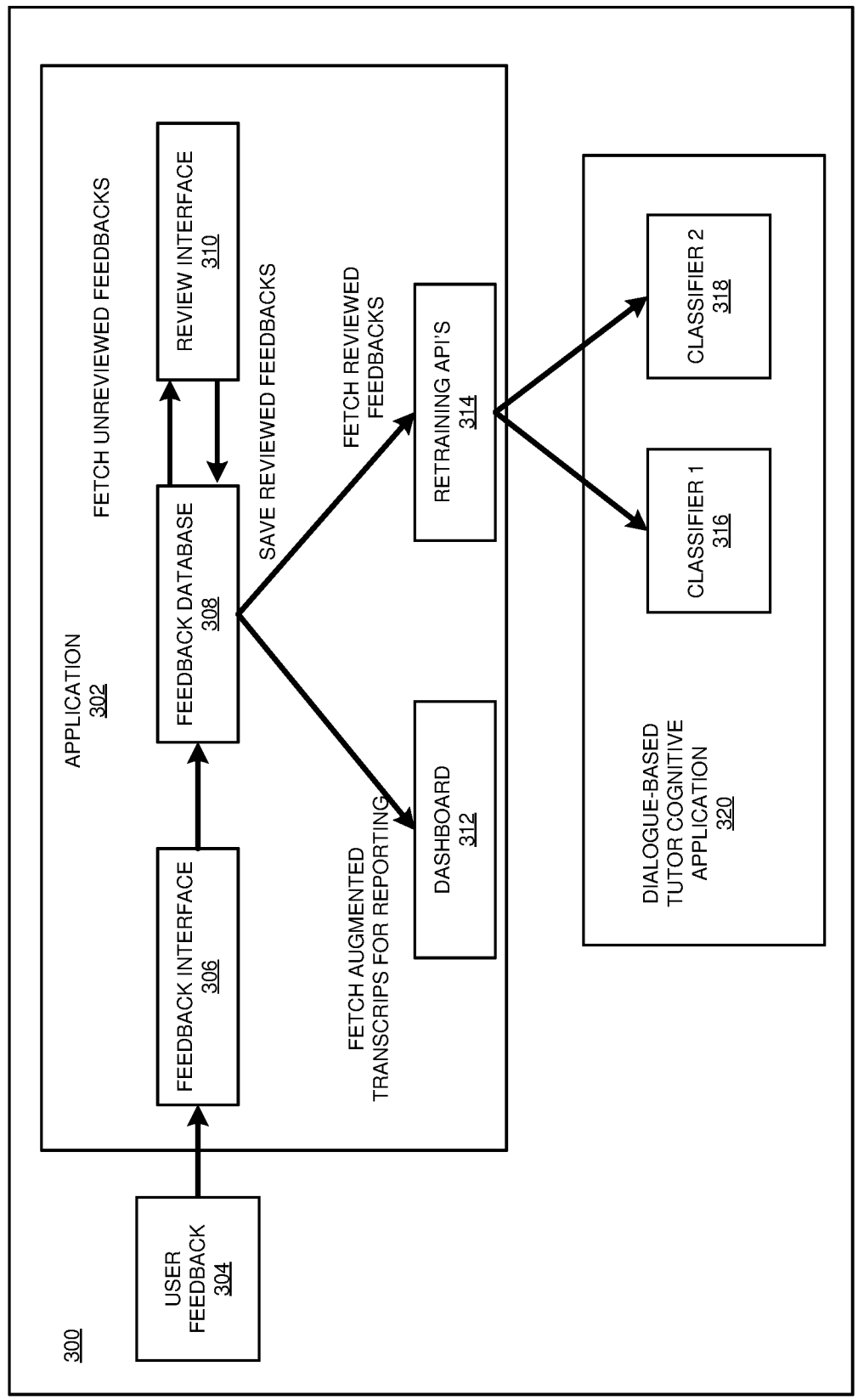
FIG. 3 depicts a block diagram of improving performance of dialogue-based tutors in accordance with an embodiment.

With respect to FIG. 3, this figure depicts a block diagram 300 of an application 302 for improving performance of dialogue-based tutors in accordance with an embodiment. Application 302 is an example of application 105 of FIG. 1. In the embodiment, during a feedback phase user feedback 304 is provided to a feedback interface 306 of application 302 from users, such as students interacting with a DBT cognitive application 320. DBT cognitive application 320 is an example of DBT cognitive application 107 of FIG. 1. In the embodiment, application 302 stores the user feedback in feedback database 308. During a review phase, reviewers use a review interface 310 of application 302 to fetch unreviewed feedback from feedback database 308 and provide a feedback decision for the unreviewed feedback. The reviewed feedback is save in feedback database 308.

During a retraining phase, a dashboard 312 is used to fetch augmented transcripts for reporting from feedback database 306. If a threshold number of reviewers approve the feedback, retraining APIs 314 fetch the reviewed feedback from feedback database 306 and train a first classifier 316 and a second classifier of DBT cognitive application 320 using the review feedback as described herein.

Figure 4:
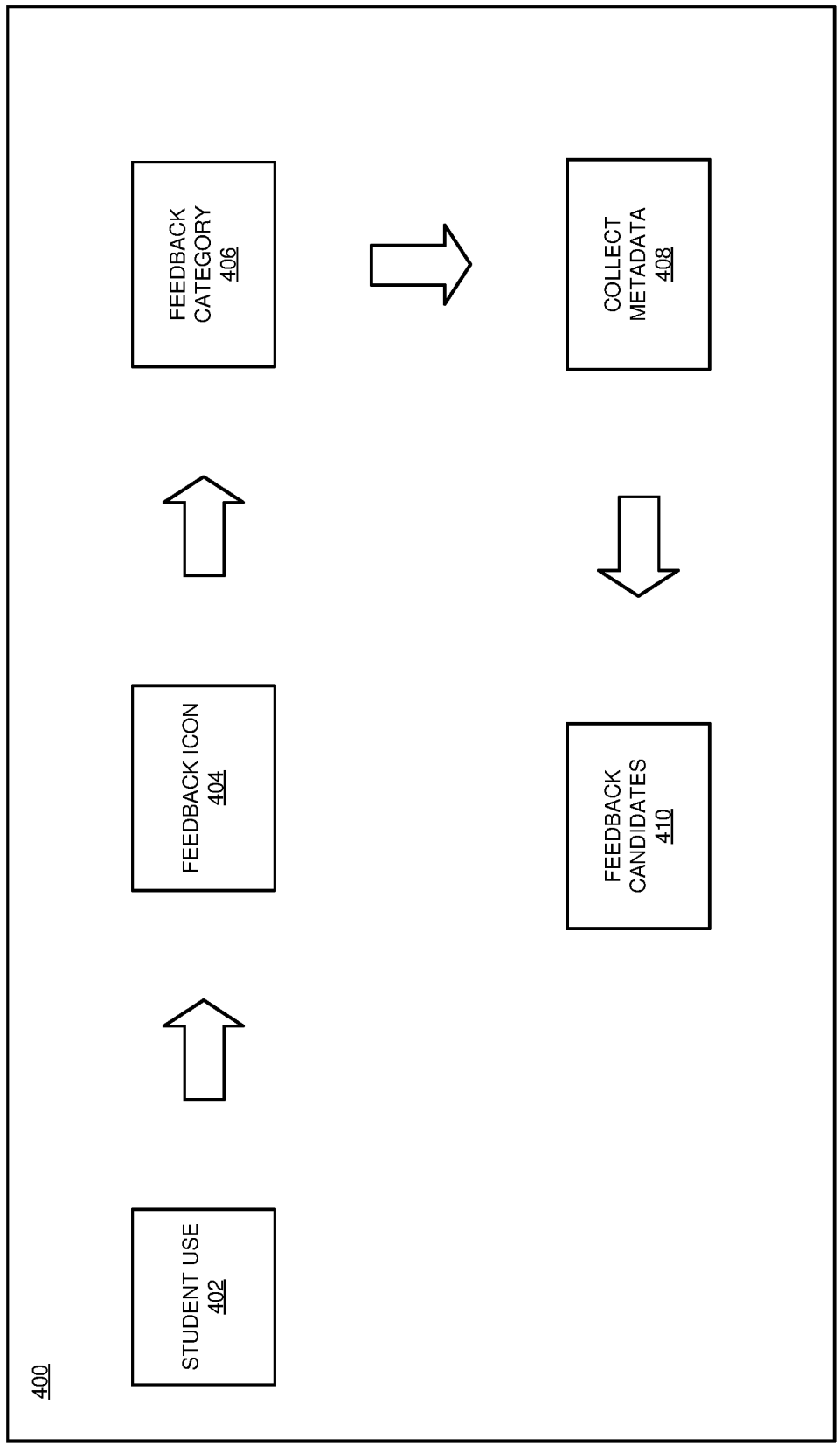
FIG. 4 depicts a block diagram of a process for collecting student feedback during a feedback phase of an application in accordance with an embodiment.

With reference to FIG. 4, this figure depicts a block diagram 400 of a process for collecting student feedback during a feedback phase of application 302 in accordance with an embodiment. During student use 402 of a DBT, a student clicks a feedback icon 404 and is presented with a choice of feedback categories. Once students select a feedback category 406, the DBT collects metadata 408 required to present feedback candidates to reviewers. In particular embodiments, the metadata includes information that is directly relevant to each feedback category. In the embodiment, the feedback candidates are stored in a feedback database and later presented to reviewers to collectively decide if the feedback candidates should be used to make changes in the DBT training or content.

Figure 5:
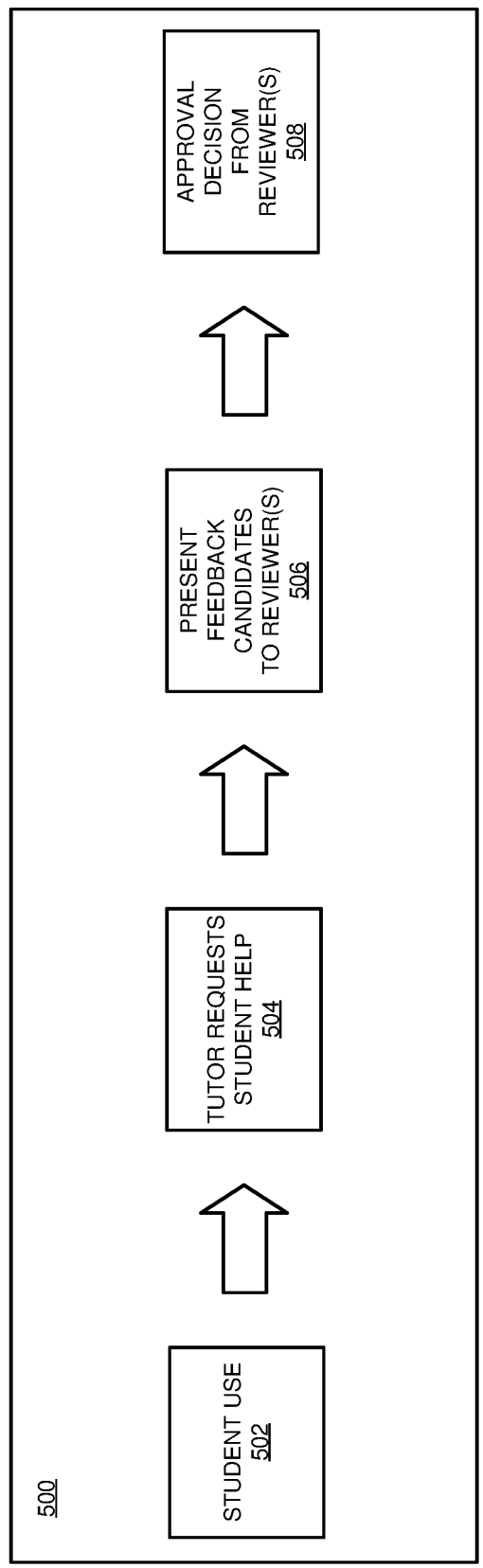
FIG. 5 depicts a block diagram of a process for review of feedback by students during a review phase of an application in accordance with an embodiment.

With reference to FIG. 5, this figure depicts a block diagram 500 of a process for review of feedback by students during a review phase of application 302 in accordance with an embodiment. During student use 502 of a DBT, application 302 requests help 504 from the student for review of feedback candidates received from other students during use of the DBT. Application 302 presents feedback candidates 506 to one or more reviewers, such as the student, and the one or more reviewers is asked to answer a yes/no question to provide an approval decision 508 about whether the feedback candidate is approved.

Figure 6:
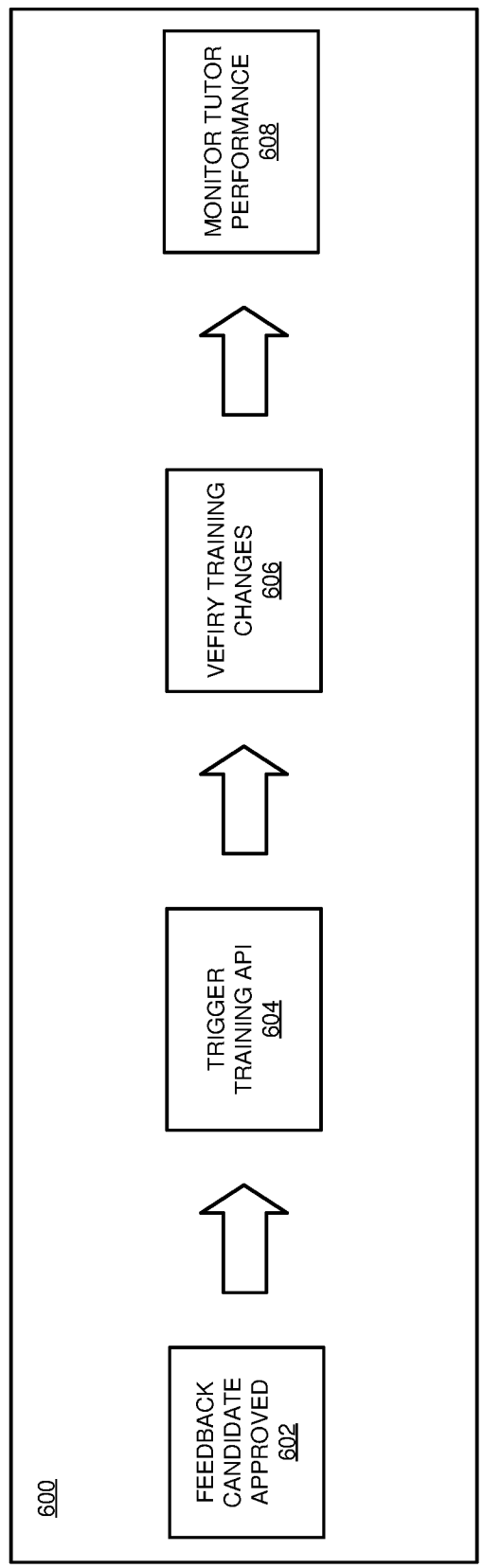
FIG. 6 depicts a block diagram of a process for automatic retraining of feedback candidates during a retraining phase of an application in accordance with an embodiment.

With reference to FIG. 6, this figure depicts a block diagram 600 of a process for automatic retraining of feedback candidates during a retraining phase of application 302 in accordance with an embodiment. An approved feedback candidate 602 automatically triggers a retraining event by invoking a relevant API 604 for the appropriate feedback category to train one or more classifiers of the DBT. Application 302 verifies the training changes 606 and monitors tutor performance 608 by observing the amount of feedback received for the particular content item with the expectation that negative feedback be should be reduced. In one or more embodiments, if the negative feedback is increased, application 302 may trigger an automated rollback of the approved change.

Figure 7:
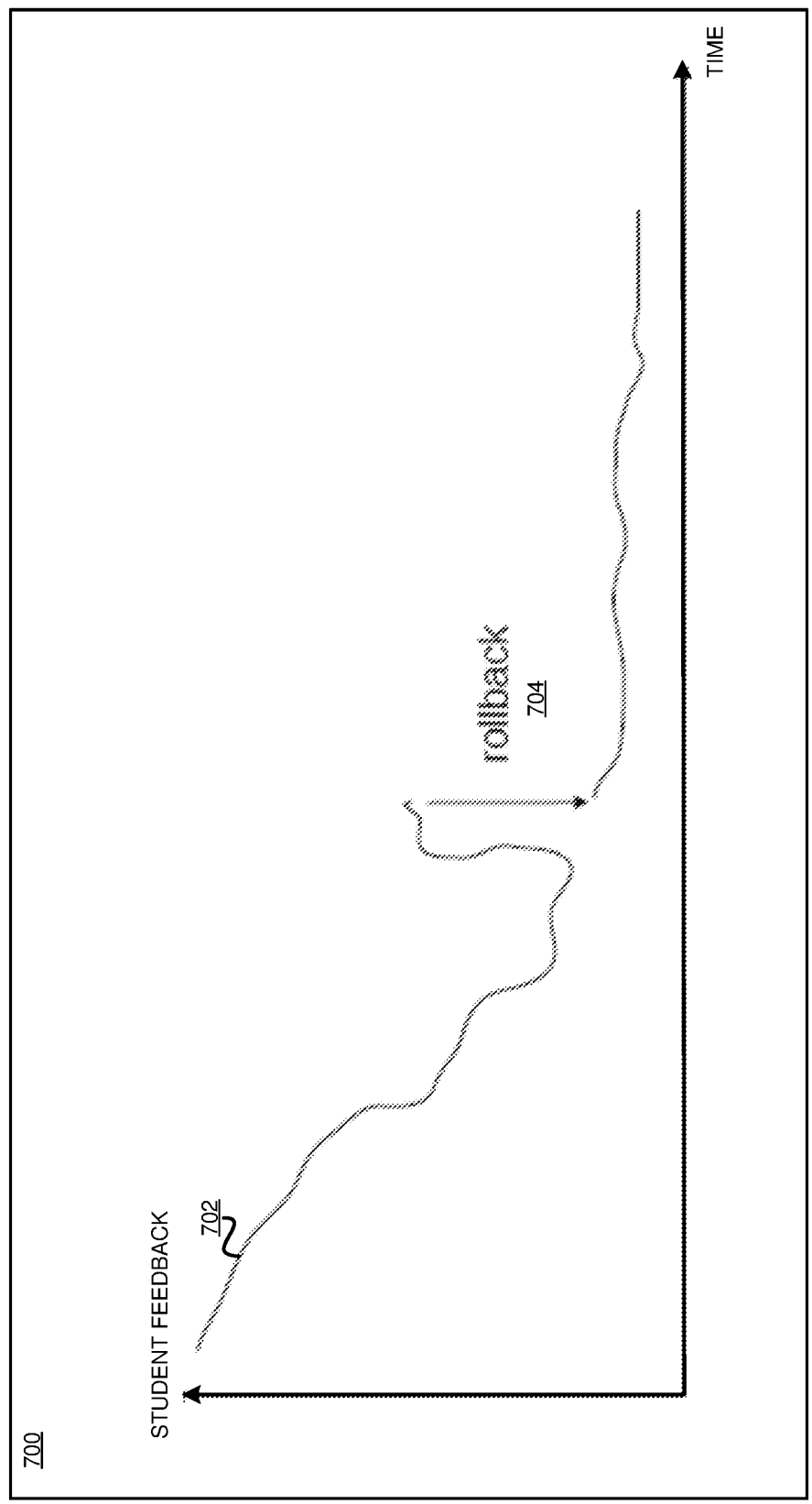
FIG. 7 depicts an example graphical plot of negative student feedback vs time for a retraining procedure in accordance with an embodiment.

With reference to FIG. 7, this figure depicts an example graphical plot 700 of negative student feedback vs time for a retraining procedure in accordance with an embodiment. A line plot 702 of negative student feedback continues to decrease over time until a sudden increase in negative feedback caused by an approved change that has a negative effect on student experience with the DBT. A rollback 704 of the change is triggered results in the negative student feedback again decreasing over time.

Figure 8:
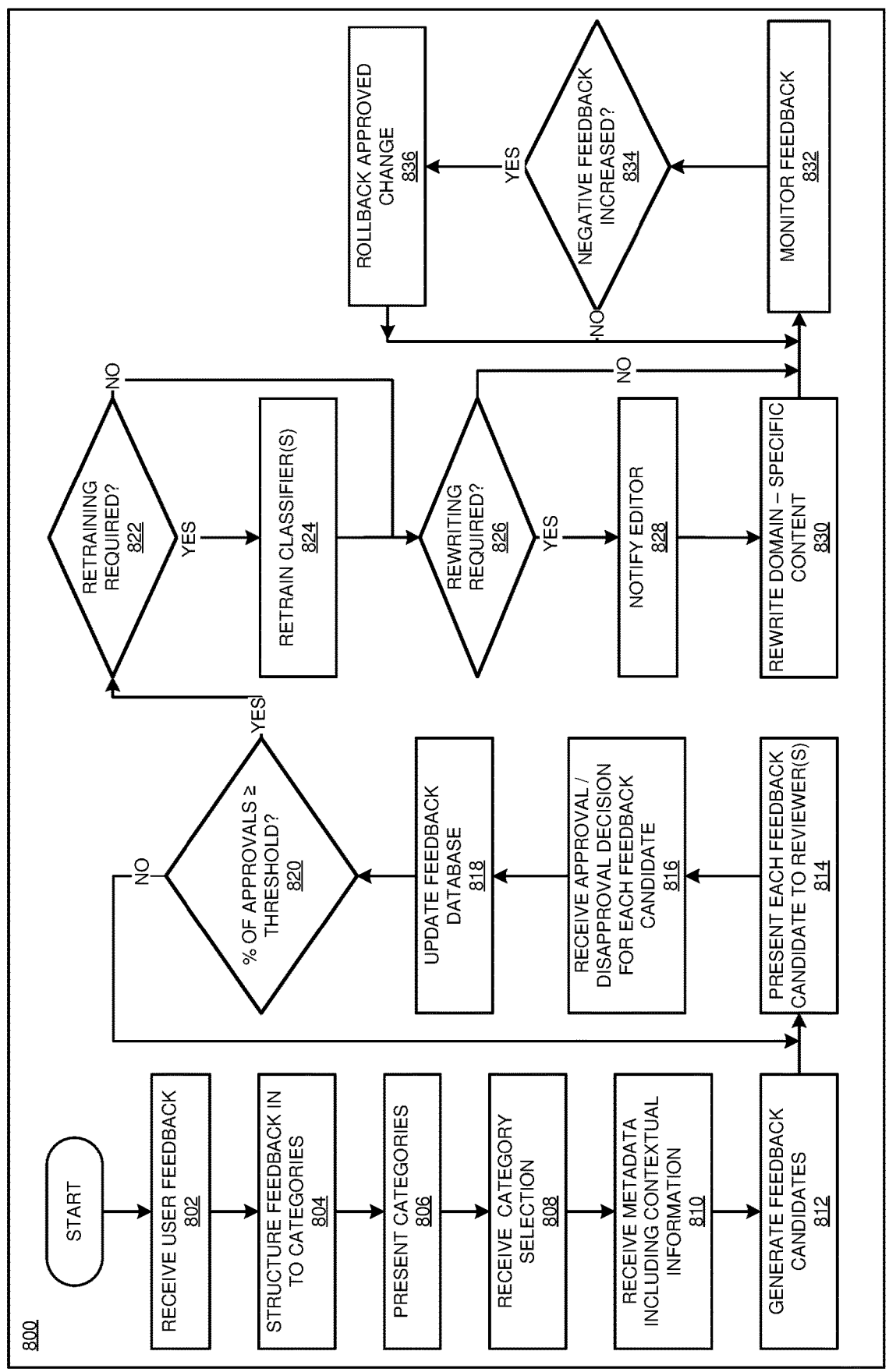
FIG. 8 depicts a flowchart of an example process for improving performance of dialogue-based tutors using user feedback in accordance with an illustrative embodiment.

With reference to FIG. 8, this figure depicts a flowchart of an example process 800 for improving performance of dialogue-based tutors using user feedback in accordance with an illustrative embodiment. In one or more embodiments, process 800 can be implemented in application 105 or application 302. In block 802, application 105 receives user feedback from a user, such as a student, associated with an interaction of the user with a DBT. In block 804, application 105 structures the feedback into one or more feedback categories based upon the user feedback and/or possible intents of the user. In block 806, application 105 presents the feedback categories to the user. In block 808, application 105 receives a category selection from among the feedback categories from the user. In block 810, application 105 receives metadata including contextual information associated with the feedback with respect to the selected category. In one or more embodiments, application 105 stores the feedback, selected feedback category and metadata in a feedback database.

In block 812, application 105 generates feedback candidates based upon the feedback, feedback category and metadata. In the embodiment, a feedback candidate is indicative of a potential change in the tutor training or content based upon the feedback. In block 814, application 105 presents each feedback candidates to one or more reviewers. In particular embodiments, the one or more reviewers may include students demonstrating knowledge of the topic, instructors, and/or subject matter experts (SME). In block 816, application 105 receives an approval or disapproval decision for each feedback candidate. In block 818, application 105 updates the feedback database with the approval/disapproval decision.

In block 820, application 105 determines whether a percentage of approvals of a feedback candidate is greater than or equal to a predetermined approval threshold. If the percentage of approvals is not greater than or equal to the predetermined threshold, process 800 returns to block 814. If the percentage of approvals is greater than or equal to the predetermined approval threshold, process 800 continues to block 822.

In block 822, application 105 determines whether retraining of the DBT is required using the feedback candidate. If retraining is required, in block 824 application 105 retrains one or more classifiers of the DBT based upon the feedback candidate and process 800 continues to block 826. If no retraining is required, process 800 continues to block 826.

In block 826, application 105 determines whether rewriting of domain-specific content of the DBT is required based upon the feedback candidate. If rewriting is required, in block 828 application 105 notifies an editor of the necessity for rewriting the domain-specific content. In block 830, application 105 receives edited domain-specific content from the editor and rewrites the domain-specific content in the DBT and process 800 continues to block 832. If rewriting is not required, process 800 continues to block 832.

In block 832, application 105 monitors feedback related to the retrained or rewritten content of the DBT. In block 834, application 105 determines whether negative feedback related the change has increased above a predetermined level. If negative feedback has increased above the predetermined level, in block 836 application 105 performs a rollback of the approved change in the DBT and process 800 returns to block 832. If negative feedback has not increased above the predetermined level, process 800 returns to block 832.

Thus, a computer implemented method, system or apparatus, and computer program product are provided in the illustrative embodiments for improving performance of dialogue-based tutors using user feedback and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for improving performance of a dialogue-based tutor, comprising:
   receiving feedback from a user associated with a natural language interaction of the user with a dialogue-based tutoring (DBT) system, the DBT system including training data and domain-specific content;
   presenting one or more feedback categories to the user based upon the feedback;
   receiving, from the user, a selection of a feedback category from among the one or more feedback categories;
   generating a feedback candidate based upon the feedback and the selected feedback category, the feedback candidate being indicative of a potential change in one or more of the training data and the domain-specific content based upon the feedback;
   presenting the feedback candidate to at least one reviewer; and
   receiving an approval decision for the feedback candidate from the at least one reviewer.

2. The method of claim 1, further comprising:
   receiving metadata including contextual information associated with the feedback with respect to the selected category.

3. The method of claim 2, wherein generating the feedback candidate is further based upon the metadata.

4. The method of claim 1, further comprising:
   storing the feedback, selected feedback category, and feedback candidate in a database.

5. The method of claim 1, further comprising:
   updating a database with the approval decision.

6. The method of claim 1, further comprising:
   determining that a measure of approval decisions for the feedback candidate is greater than or equal to a threshold value.

7. The method of claim 6, further comprising:
   retraining, responsive to the measure of approval decisions being greater than or equal to the threshold value, the training data of the DBT system based upon the feedback candidate.

8. The method of claim 7, wherein retraining the training data includes retraining one or more classifiers of the DBT system based upon the feedback candidate.

9. The method of claim 7, further comprising:
   determining that negative feedback related to the change has increased above a predetermined level; and
   rolling back the retraining of the training data of the DBT system.

10. The method of claim 6, further comprising:
    re-writing, responsive to the measure of approval decisions being greater than or equal to the threshold value, the domain-specific content of the DBT system based upon the feedback candidate.

11. The method of claim 10, further comprising:
    notifying an editor of a necessity for rewriting the domain-specific content; and
    receiving edited domain-specific content from the editor.

12. A computer usable program product comprising one or more computer-readable storage mediums, and program instructions stored on at least one of the one or more storage mediums, the stored program instructions comprising:
    program instructions to receive feedback from a user associated with a natural language interaction of the user with a dialogue-based tutoring (DBT) system, the DBT system including training data and domain-specific content;
    program instructions to present one or more feedback categories to the user based upon the feedback;
    program instructions to receive, from the user, a selection of a feedback category from among the one or more feedback categories;
    program instructions to generate a feedback candidate based upon the feedback and the selected feedback category, the feedback candidate being indicative of a potential change in one or more of the training data and the domain-specific content based upon the feedback;
    program instructions to present the feedback candidate to at least one reviewer; and
    program instructions to receive an approval decision for the feedback candidate from the at least one reviewer.

13. The computer usable program product of claim 12, further comprising:
    program instructions to receive metadata including contextual information associated with the feedback with respect to the selected category.

14. The computer usable program product of claim 13, wherein generating the feedback candidate is further based upon the metadata.

15. The computer usable program product of claim 12, further comprising:
program instructions to store the feedback, selected feedback category, and feedback candidate in a database.

16. The computer usable program product of claim 12, further comprising:
program instructions to update a database with the approval decision.

17. The computer usable program product of claim 12, further comprising:
program instructions to determine that a measure of approval decisions for the feedback candidate is greater than or equal to a threshold value.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive feedback from a user associated with a natural language interaction of the user with a dialogue-based tutoring (DBT) system, the DBT system including training data and domain-specific content;
program instructions to present one or more feedback categories to the user based upon the feedback;
program instructions to receive, from the user, a selection of a feedback category from among the one or more feedback categories;
program instructions to generate a feedback candidate based upon the feedback and the selected feedback category, the feedback candidate being indicative of a potential change in one or more of the training data and the domain-specific content based upon the feedback;
program instructions to present the feedback candidate to at least one reviewer; and
program instructions to receive an approval decision for the feedback candidate from the at least one reviewer.

\* \* \* \* \*